(12) United States Patent
Scott

(10) Patent No.: US 7,588,028 B2
(45) Date of Patent: Sep. 15, 2009

(54) BIOMASS BURNER

(76) Inventor: Franklin Scott, Unit 1, 2 Outram Street, West Perth, Western Australia (AU) 6005

( * ) Notice: Subject to any disclaimer, the term of this patent is extended or adjusted under 35 U.S.C. 154(b) by 1022 days.

(21) Appl. No.: 10/275,428

(22) PCT Filed: Apr. 27, 2001

(86) PCT No.: PCT/AU01/00481

§ 371 (c)(1),
(2), (4) Date: Sep. 16, 2003

(87) PCT Pub. No.: WO01/86205

PCT Pub. Date: Nov. 15, 2001

(65) Prior Publication Data
US 2004/0237957 A1 Dec. 2, 2004

(30) Foreign Application Priority Data
May 11, 2000 (AU) .................... PQ7445

(51) Int. Cl.
F24C 15/32 (2006.01)
F23K 1/04 (2006.01)
A01G 7/02 (2006.01)

(52) U.S. Cl. .............. 126/77; 126/73; 126/76; 126/103; 126/112; 47/17; 110/241; 110/254; 110/315

(58) Field of Classification Search .......... 126/77, 126/79, 67, 68, 69, 70, 71, 72, 73, 74, 75, 126/76, 103, 112, 107; 110/210, 224, 241, 110/254, 315; 47/17
See application file for complete search history.

(56) References Cited

U.S. PATENT DOCUMENTS

| 253,144 | A | * | 1/1882 | Willi | 126/68 |
| 604,991 | A | * | 5/1898 | Litchfield et al. | 126/73 |
| 644,792 | A | * | 3/1900 | Boal | 126/58 |
| 651,103 | A | * | 6/1900 | Coppens | 126/77 |
| 3,691,930 | A | * | 9/1972 | Steinman | 454/8 |
| 3,961,587 | A |   | 6/1976 | Ozawa | |
| 4,048,927 | A |   | 9/1977 | Augustin et al. | |
| 4,073,089 | A | * | 2/1978 | Maginnes et al. | 47/17 |
| 4,213,404 | A | * | 7/1980 | Spaulding | 110/229 |
| 4,285,328 | A | * | 8/1981 | Fritz et al. | 126/225 |
| 4,355,587 | A | * | 10/1982 | Lemon | 110/293 |
| 4,360,000 | A | * | 11/1982 | Down | 126/77 |

(Continued)

FOREIGN PATENT DOCUMENTS

AU    80319/82    11/1982

(Continued)

*Primary Examiner*—Carl D Price
(74) *Attorney, Agent, or Firm*—Harness, Dickey & Pierce, P.L.C.

(57) ABSTRACT

A burner comprising a fuel reservoir, a primary combustion zone located at the lower end of the fuel reservoir, a secondary combustion zone located underneath the primary combustion zone, a passage providing communication between the primary and secondary combustion zones, a flue for discharging products of combustion from the secondary combustion zone, the primary combustion zone having a peripheral wall incorporating air hole means to provide combustion air to the primary combustion zone, wherein the cross-sectional area of the air hole means is substantially equal to the combined minimum cross-sectional area of the passage and the minimum cross?sectional flow area of the flue.

26 Claims, 3 Drawing Sheets

U.S. PATENT DOCUMENTS

| | | | | |
|---|---|---|---|---|
| 4,421,040 A | * | 12/1983 | Lindstrom | 110/294 |
| 4,461,243 A | * | 7/1984 | Carpaneto | 122/16.1 |
| 4,473,059 A | * | 9/1984 | Nason | 126/58 |
| 4,502,462 A | * | 3/1985 | Lawrence | 126/77 |
| 4,572,155 A | * | 2/1986 | Engblom | 126/76 |
| 4,607,610 A | * | 8/1986 | Zimmermann | 126/76 |
| 4,690,697 A | * | 9/1987 | Schwartz et al. | 47/59 R |
| 4,832,000 A | * | 5/1989 | Lamppa et al. | 126/77 |
| 5,713,154 A | * | 2/1998 | Goldstein et al. | 47/17 |

FOREIGN PATENT DOCUMENTS

| | | | |
|---|---|---|---|
| AU | 550050 | | 2/1986 |
| JP | 10132246 A | | 5/1998 |
| JP | 11063445 A | | 3/1999 |
| JP | 10347964 | * | 6/2000 |
| JP | 2000274626 A | | 10/2000 |

* cited by examiner

BIOMASS BURNER

FIELD OF THE INVENTION

This invention relates to a burner.

The invention has been devised particularly, although not exclusively, as a burner for generating heat from combustion of low grade fuels including biomass material such as animal manure and "greenwaste" materials.

BACKGROUND ART

Australian patent 550050 discloses a burner for solid fuel including biomass material.

The invention according to patent application 550050 describes a burner having a fuel reservoir, a combustion chamber, a grate and a flue. The fuel reservoir is supported above the combustion chamber to open into the combustion chamber at its lower end. Fuel is supported in the grate above the combustion chamber for preheating and/or ignition before entering the combustion chamber. The flue is connected into the combustion chamber to remove combustion products. The fuel reservoir is provided with an air inlet at a location spaced above the grate. The air inlet is typically in the form of a plurality of circumferentially spaced holes arranged around the walls of the fuel reservoir at its lower end.

The present invention relates to improvements to the burner disclosed in the above-mentioned patent.

DISCLOSURE OF THE INVENTION

The present invention provides a burner comprising a fuel reservoir, a primary combustion zone located at the lower end of the fuel reservoir, a secondary combustion zone located underneath the primary combustion zone, a passage providing communication between the primary and secondary combustion zones, a flue for discharging products of combustion from the secondary combustion zone, the primary combustion zone having a peripheral wall incorporating air hole means to provide combustion air to the primary combustion zone, wherein the cross-sectional area of the air hole means is substantially equal to the combined minimum cross-sectional area of the passage and the minimum cross-sectional flow area of the flue.

The air hole means may comprise a plurality of holes disposed circumferentially about the primary combustion zone.

The passage providing communication between the primary and secondary combustion zones preferably tapers inwardly in the direction from the primary combustion zone to the secondary combustion zone in the fashion of a funnel.

It is preferable that the primary combustion zone and the secondary combustion zone be positioned in a manner whereby they are situated close enough for the flames from the primary combustion zone to unite with the flames from the secondary combustion zone.

The flue is preferably provided with an inlet adjacent the secondary combustion zone for removal of the combustion products. The combustion products pass from the secondary combustion zone via the flue inlet through a flue passage and exit the burner via a flue outlet.

Preferably, the minimum cross-sectional flow area of the flue corresponds with the cross-sectional area of the flue inlet. The cross-sectional area of the flue inlet is preferably of approximately equal cross-sectional area to that of the flue passage.

Preferably, a fuel grate is provided at the base of the primary combustion zone.

Preferably, the fuel reservoir has a closable loading entry through which fuel can be loaded into the fuel reservoir.

Fuel loaded into the fuel reservoir rests on the fuel grate. Primary combustion occurs within the primary combustion zone above the fuel grate and is supported by combustion air supplied through the air hole means. As the waste burns, it disintegrates and falls through the grate into the secondary combustion zone as char. The combustion of this char, combined with the volatile gases from the fuel, produces a very high and efficient reaction.

Feedstock which provides the fuel is first preheated in the fuel reservoir. This allows wet feedstock to be utilized. The feedstock is then pyrolyzed in the primary combustion zone above the fuel grate. The resulting pyrolysis gases are then completely oxidized in the secondary combustion zone. Heat is internally recovered from the oxidation step and used to preheat and dry the wet feedstock. Heat which is generated can also be recovered for other purposes such as generation of a hot air stream for space or processing heating.

A heat exchanger may be associated with the flue for extraction of heat energy in the products of combustion. The heat exchanger may comprise a shell and tube-type heat exchanger having an annular flue passage which forms part of the flue and through which the products of combustion pass. The annular flue passage may be bounded by an inner tube surrounding a central passage through which an air stream can pass to be heated by heat transfer from the products of combustion passing along the annular flue passage. The annular flue passage may also be bounded by an outer tube, spaced from the inner tube, located in an air reservoir containing a body of air. The air in the air reservoir may be heated by heat transfer from the products of combustion passing along the annular flue passage. The air reservoir may surround at least part of the fuel reservoir and upper combustion zone such that heat transfer from the heated air in the reservoir can be used to assist drying of fuel contained in the fuel reservoir. The heated air in the air reservoir may also provide the combustion air which enters the primary combustion zone through the hole means. In this way, the combustion air is preheated.

Moisture from the drying fuel passes from the fuel reservoir and primary combustion zone through the passage to the secondary combustion zone and exits through the flue.

An air heating chamber may be located adjacent the secondary combustion zone, which is the hottest region within the burner. Inlet air may be introduced into the air heating chamber through the central passage of the shell-and-tube heat exchanger. Alternatively, air may be introduced into the air heating chamber by any other means such as a fan. The heated air may be removed by means of suitable system such as a fan system.

The flue may incorporate a diversion line through which at least some of the products of combustion exiting from the secondary combustion zone can be selectively diverted to the fuel reservoir. This assists the drying process of wet feedstock and so accelerates the combustion process.

Means may be provided for pressurizing the secondary combustion zone. This will ensure that volatile pyrolysis gases remain in the secondary combustion zone for a longer period of time so as to be completely oxidized.

The secondary combustion zone may be pressurised by delivering air under pressure into the secondary combustion zone.

A means may be provided for selectively blocking at least part of the flue to assist pressurization of the secondary combustion zone. The means may comprise a damper incorporated into the flue. The damper may operate under a control means adapted to operate the damper to achieve a predetermined pressure within the secondary combustion chamber once a prescribed operational temperature of the burner has been achieved. The control means may be in the form of a spring loaded means.

As can be seen, the burner may be used to produce heat from the burning of fuel whilst also providing a means for the thermal destruction of the fuel which is particularly advantageous in the case of biomass waste.

Exhaust gases from the burner contain primarily carbon dioxide and water. Accordingly, the exhaust gases are particularly suitable for use in promoting the growth of plant life. To this end, the flue gases may be diverted into a greenhouse environment where plant growth can be promoted through the process of photosynthesis which converts the carbon dioxide into oxygen. Alternatively, the flue exhaust gases may first pass to a slow release tank to allow for the controlled release of exhaust gases to the greenhouse environment.

It is believed that this would be a particularly useful system for reducing greenhouse gas emissions where biomass material is used as feedstock for the burner. Biomass material is neutral in terms of carbon dioxide in that decomposition of biomass material releases carbon dioxide into the atmosphere in any event and thus burning it would not add to the net levels of carbon dioxide production. A particular advantage of the arrangement involving passing the exhaust gases through a greenhouse environment is that the carbon dioxide so produced is converted back into oxygen.

BRIEF DESCRIPTION OF THE DRAWINGS

The invention will be better understood by reference to the following description of several specific embodiments thereof as shown in the accompanying drawings in which.

BEST MODE(S) FOR CARRYING OUT THE INVENTION

Figure 1:
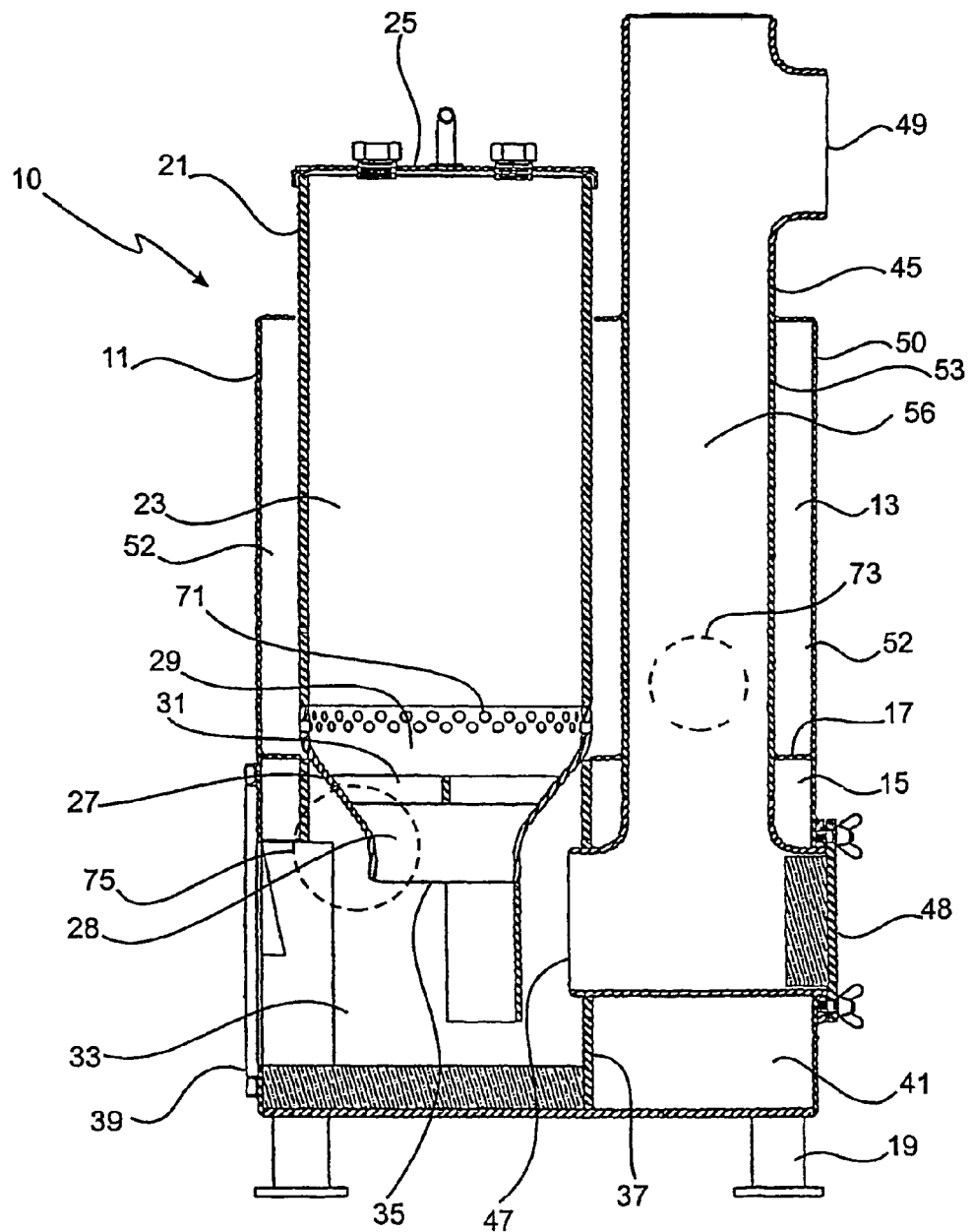
FIG. 1 is a schematic view of a burner according to a first embodiment.
Figure 2:
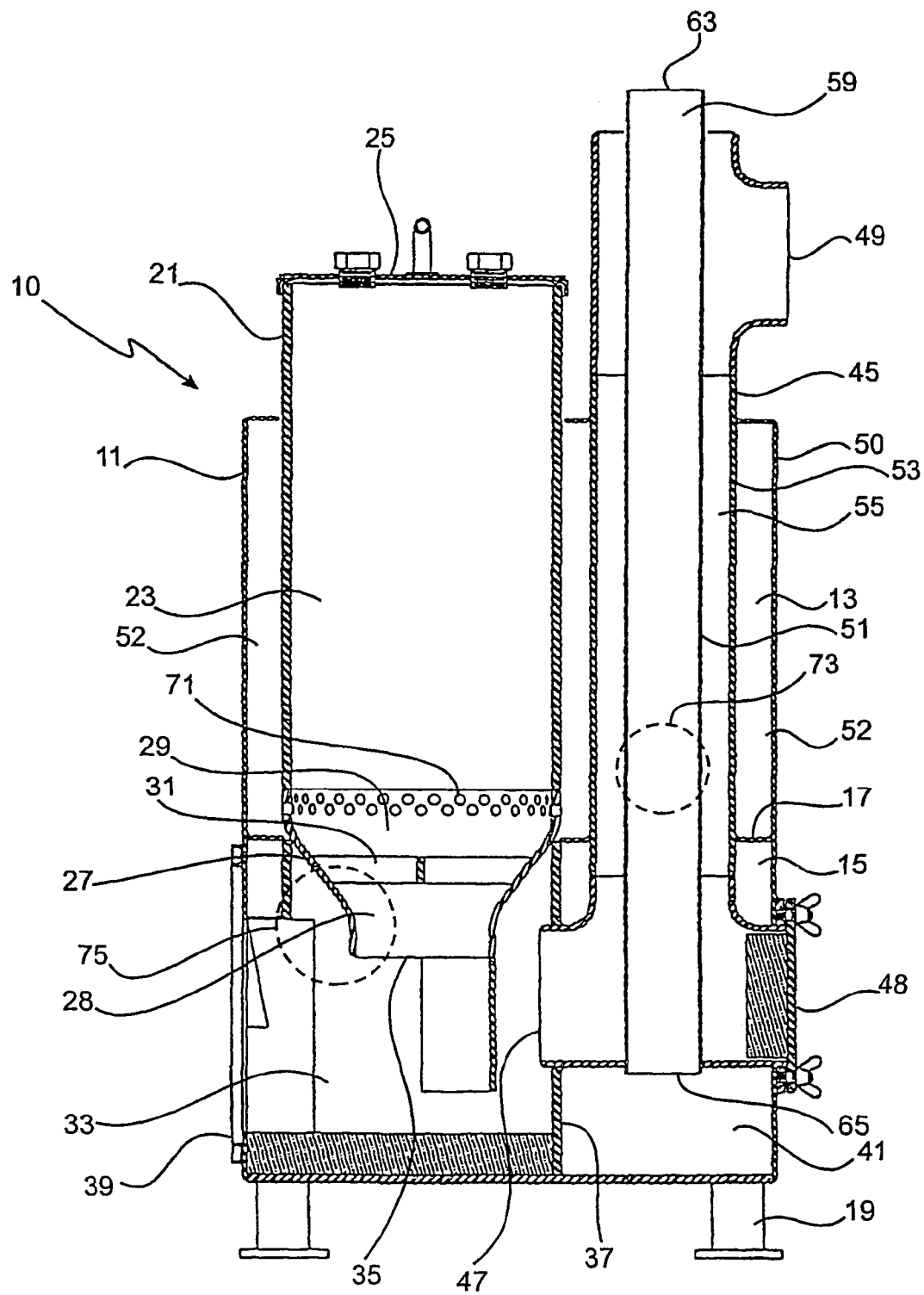
FIG. 2 is a schematic view of a burner according to a second embodiment.

Referring to FIGS. 1 and 2 of the drawings, there is shown a burner 10 according to the first embodiment. The burner 10 comprises an outer housing 11 defining an upper section 13 and a lower section 15 separated by an internal wall 17. The outer housing 11 is supported on a base 19.

A generally cylindrical body 21 is mounted on the outer housing 11. The body 21 is primarily located in the upper section 13, although the lower end thereof extends to the lower section 15 and the upper end thereof extends beyond the outer housing 11. The body 21 defines a fuel reservoir 23 and incorporates a lid 25 which can be opened to load feedstock into the fuel reservoir 23. The lower end section of the body 21 incorporates an inwardly tapering funnel section 27 which defines a passage 28 providing communication between a primary combustion zone 29 disposed at the lower end of the fuel reservoir above a fuel grate 31 and a secondary combustion zone 33 located in the lower section 15 of the outer housing 11. The tapering section 27 terminates at a port 35 which opens onto the secondary combustion zone 33.

The secondary combustion zone 33 is defined within the lower section 15 between a partition wall 37 therein and an access door 39 though which ash and other debris can be removed from the secondary combustion zone. An air heating chamber 41 is defined in the lower section 15 of the outer housing 11 on the opposed side of the partition wall 37 to the secondary combustion zone 33.

The burner 10 is provided with a flue 45 having a inlet 47 which opens onto the secondary combustion zone 33 and an outlet 49. The products of combustion pass from the secondary combustion zone 33 in the flue inlet 47 through the flue passage 56 to exit via the flue outlet 49.

In the second embodiment shown in FIG. 2 (which is not drawn to scale), the flue 45 is incorporated in a shell and tube-type heat exchanger 50 designed to extract thermal energy in products of combustion exiting from the secondary combustion zone 33 via the flue 45. The heat exchanger 50 has an inner tube 51 and an outer tube 53 spaced from the inner tube 51 to define an annular flue passage 55 therebetween which forms part of the flue. As will be noted, the flue passage 56 in the first embodiment is of generally cylindrical shape, whereas the flue passage in the second embodiment is annular.

The annular flue passage 55 communicates with the flue inlet 47 and the flue outlet 49 to allow the products of combustion to exit the burner. The outer tube 53 extends through the upper section 13 of outer housing 11 as shown in the drawings. The inner tube 51 defines a central passage 59 through which air can be delivered to the air heating chamber 41, the central passage 59 having an inlet 63 through which air enters the passage and an outlet 65 opening into the heating chamber 41. Heated air is extracted from the heating chamber 41 by any suitable means (not shown).

The flue 45 is provided with a flue access door 48 through which soot and other debris can be removed from the flue.

The upper section 13 of the outer housing 11 defines an air reservoir 52.

With the heat exchanger 50, products of combustion exiting the secondary combustion zone 33 via the flue 45 pass in heat exchange relationship with both the inner tube 51 to thereby heat incoming air flowing along passage 59 and the outer tube 53 to thereby heat air accommodated in the air reservoir 52 in the upper section 13.

Heated air contained in the air reservoir 52 surrounds that part of the body 21 accommodated in the upper section 13 and so is in heat exchange relationship therewith to provide heat which assists drying of any wet feedstock introduced into the fuel reservoir 23.

The cylindrical body 21 has a peripheral wall which incorporates a hole means in the form of a plurality of air holes 71 providing communication between the air reservoir 52 and the primary combustion zone 29. The air holes 71 provide combustion air for the primary combustion zone 29. With this arrangement, the combustion air provided to the primary combustion zone 29 from the air reservoir 52 through the air holes 71 is heated by the action of the heat exchanger 50 as previously explained.

The air reservoir 52 in the upper section 13 is provided with an air inlet opening 73 through which ambient air can enter the air reservoir.

The burner 10 is provided with a heated air outlet 75 for release of heated air.

A particular feature of the burner is that the total flow area of the air holes 71 providing combustion air to the primary combustion zone 29 is substantially equal to the combined flow area of the port 35 in the passage 28 between the upper and lower combustion zones and the minimum flow area of the flue 45. It should be noted that the smallest cross-sectional area of the passage 28 is located at the port 35, and the smallest cross-sectional flow area of the flue 45 is located at the flue inlet opening 47. It has been found that this relationship is particularly important in attaining optimal performance of the burner.

As will be seen in the first embodiment shown in FIG. 1, the smallest cross-sectional flow area located at the flue inlet opening 47 is equivalent to the cross-sectional flow area of the flue passage 56. In the embodiment shown in FIG. 2, the smallest cross-sectional flow area of the flue 45 is located at the flue inlet opening 47 which is equivalent to the cross-sectional flow area of the annular flue passage 55 although this is not apparent since FIG. 2 is not drawn to scale.

The figures show embodiments which have been configured for the generation of hot air. However, the burner may be adapted to use the generated heat in other ways. For example, to heat water the burner may be fitted with water heating coils attached to the outside of the heat exchanger section.

Figure 3:
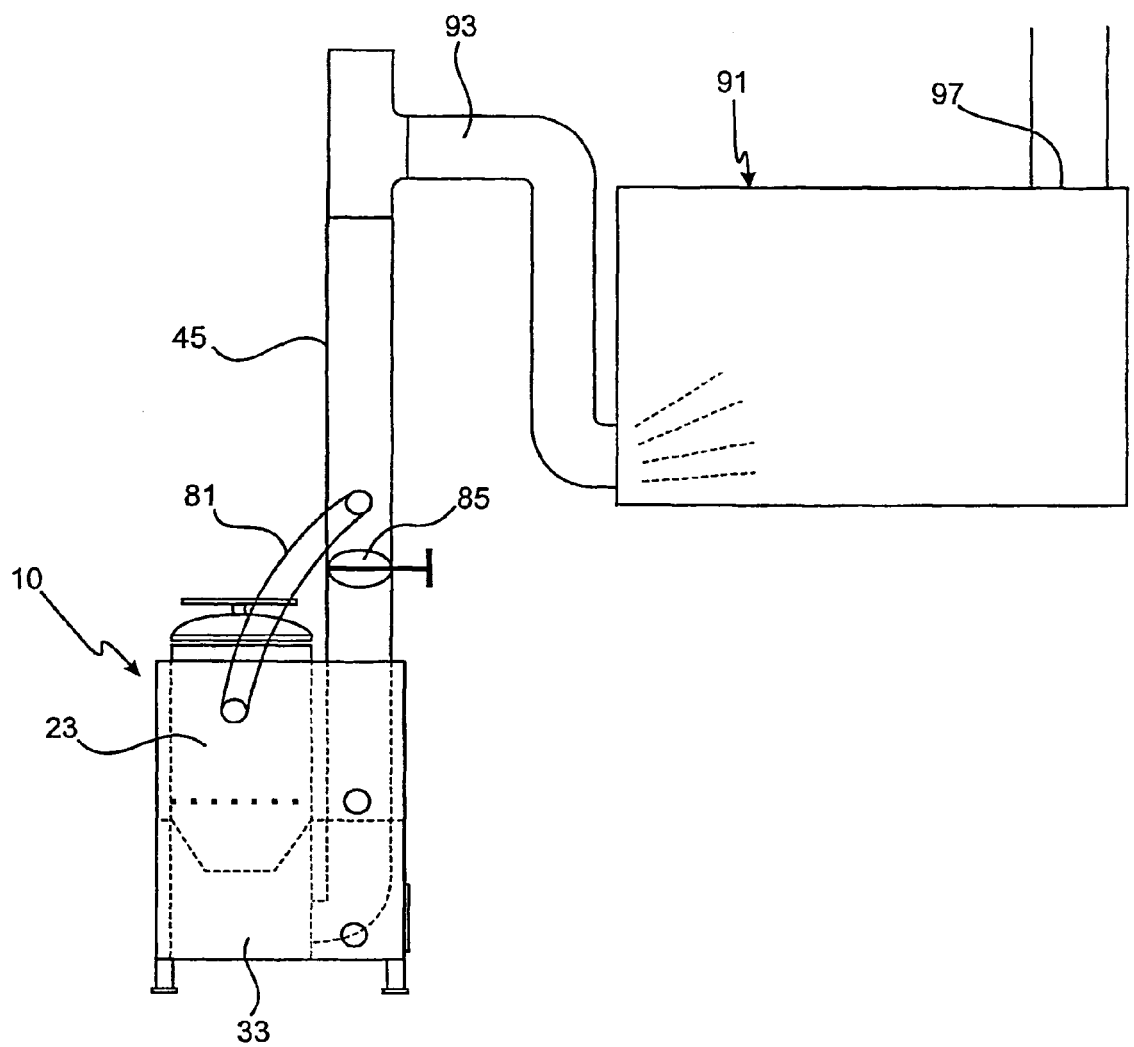
FIG. 3 is a schematic view of a burner according to a third embodiment.

Referring now to FIG. 3 of the drawings, there is shown a further embodiment of the burner. The embodiment shown in FIG. 3 operates in a similar fashion to that described in the first embodiment with the addition of several features. One such additional feature is the provision of a diversion line 81 for diverting at least some of the flue gases leaving the secondary combustion chamber 33 along flue 45 to the fuel reservoir 23. With this arrangement, the diverted flue gases are utilized to assist the drying process of wet feedstock and so accelerate the combustion process within the burner.

The burner according to the third embodiment incorporates a further feature involving pressurization of the secondary combustion zone 33. The pressurization of the secondary combustion zone is achieved by delivery of air under pressure into the secondary combustion zone by any suitable means such as an electrically operated fan. It has been found that the rate of combustion is accelerated through such pressurization. The pressurization ensures that all the volatile pyrolysis gases remain in the secondary combustion chamber for a longer period of time and are completely oxidized. Testing has demonstrated that most of the oxygen supplied to the secondary combustion zone through the pressurized air is utilized in the combustion process.

A damper 85 is incorporated in the flue 45 to assist pressurization of the secondary combustion zone. The damper 85 operates under a control system arranged to close the damper once the burner 10 has achieved a prescribed operational temperature. This can be achieved by having the damper 85 connected to a spring-loaded mechanism which operates to close the damper at the selected pressure.

In the embodiment shown in FIG. 3 of the drawings, the flue 45 is connected to a greenhouse 91 by way of a delivery line 93 which delivers exhaust gases from the burner 10 into the environment within the greenhouse. As the exhaust gases are colourless and odourless and contain primarily carbon dioxide and water, they provide an environment in the greenhouse which is conducive to plant growth. In the greenhouse, the carbon dioxide delivered from the burner 10 is converted into oxygen through the process of photosynthesis, and the converted oxygen is discharged to atmosphere through outlet 97.

It should be appreciated that the scope of the invention is not limited to the scope of the three embodiments described.

Throughout the specification, unless the context requires otherwise, the word "comprise" or variations such as "comprises" or "comprising," will be understood to imply the inclusion of a stated integer or group of integers but not the exclusion of any other integer or group of integers.

The invention claimed is:

1. A burner, comprising:
   a fuel reservoir having a primary combustion zone, a secondary combustion zone and a passage providing communication between the primary and secondary combustion zones, the fuel reservoir having a peripheral wall enclosing at least a portion of the primary combustion zone, the peripheral wall including at least one hole for providing combustion air to the primary combustion zone; and
   a flue for discharging products of combustion from the secondary combustion zone, a minimum cross-sectional flow area of the flue combined with a cross-sectional area of the passage being substantially equal to a combined cross-sectional flow area of the holes in the peripheral wall.

2. A burner according to claim 1 wherein the peripheral wall includes a plurality of holes disposed circumferentially about the primary combustion zone.

3. A burner according to claim 1 wherein the flue comprises a flue inlet connected to a flue outlet by a flue passage.

4. A burner according to claim 3 wherein the minimum cross-sectional flow area of the flue is at the flue inlet.

5. A burner according to claim 3 wherein the minimum cross-sectional flow area of the flue is spaced from the flue inlet.

6. A burner according to claim 1 wherein the passage providing communication between the primary and secondary combustion zones tapers inwardly in a direction from the primary combustion zone to the secondary combustion zone.

7. A burner according to claims 1 wherein the primary combustion zone and the secondary combustion zone are positioned such that flames from the primary combustion zone unite with the flames from the secondary combustion zone.

8. A burner according to claim 1 wherein a fuel grate is provided at a lower portion of the primary combustion zone.

9. A burner according to claim 1 wherein the fuel reservoir has a closable loading entry for loading fuel into the fuel reservoir.

10. A burner according to claim 1 wherein the flue comprises a heat exchanger for extracting heat energy from the products of combustion.

11. A burner according to claim 10 wherein the heat exchanger comprises a shell-and-tube type heat recuperator having an annular flue passage forming part of the flue and through which the products of combustion pass.

12. A burner according to claim 11 wherein the annular flue passage is bounded by an inner tube surrounding a central passage of the shell and tube-type recuperator for passing and heating an air stream by heat transfer from the products of combustion passing along the annular flue passage.

13. A burner according to claim 12 wherein the annular flue passage is bounded by an outer tube, spaced from the inner tube, located in an air reservoir containing a body of air.

14. A burner according to claim 13 wherein the air reservoir is heated by heat transfer from the products of combustion passing along the annular flue passage.

15. A burner according to claim 13 wherein the air reservoir surrounds at least part of the fuel reservoir and the primary combustion zone such that heat transfer from the heated air in the reservoir assists drying of fuel contained in the fuel reservoir.

16. A burner according to claim 1 wherein an air heating chamber is located adjacent the secondary combustion zone.

17. A burner according to claim 16 wherein the air heating chamber is located adjacent to the secondary combustion zone: and a shell and tube-type recuperator is coupled to the air heating chamber, the shell and tube-type recuperator including an air inlet air introducing air into the air heating chamber through a central passage of the shell and tube-type recuperator.

18. A burner according to claim 1 wherein the flue further comprises a diversion line through which at least some of the products of combustion exiting from the secondary combustion zone are selectively diverted to the fuel reservoir.

19. A burner according to claim 1 wherein the secondary combustion zone is pressurized.

20. A burner according to claim 19 wherein the secondary combustion zone is pressurized by delivery of pressurized air to the secondary combustion zone.

21. A burner according to claim 19 wherein the secondary combustion zone is pressurized by selectively blocking at least part of the flue.

22. A burner according to claim 21 wherein the secondary combustion zone is pressurized by a damper provided in the flue.

23. A burner according to claim 22 wherein the damper operates under a control means to achieve a pressure within the secondary combustion chamber once a prescribed operational temperature of the burner has been achieved.

24. A burner according to claim 22 wherein the damper comprises a spring-loaded mechanism.

25. A burner according to claim 1 wherein the burner includes a delivery line connected to a greenhouse environment for delivering exhaust gases thereto.

26. A burner according to claim 25 wherein at least a portion of the products of combustion from the burner are diverted to the greenhouse environment from the flue.

* * * * *